(12) United States Patent
Aoi

(10) Patent No.: US 12,529,035 B1
(45) Date of Patent: *Jan. 20, 2026

(54) METHOD FOR PRODUCING INDUCED PLURIPOTENT STEM CELLS

(71) Applicant: NATIONAL UNIVERSITY CORPORATION KOBE UNIVERSITY, Hyogo (JP)

(72) Inventor: Takashi Aoi, Hyogo (JP)

(73) Assignee: NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/025,996

(22) Filed: Jan. 16, 2025

Related U.S. Application Data

(63) Continuation of application No. 16/482,296, filed as application No. PCT/JP2018/003120 on Jan. 31, 2018.

(30) Foreign Application Priority Data

Feb. 3, 2017 (JP) .................. 2017-018422

(51) Int. Cl.
*C12N 5/074* (2010.01)
*C07K 14/725* (2006.01)
*C12N 15/86* (2006.01)

(52) U.S. Cl.
CPC ........ *C12N 5/0696* (2013.01); *C07K 14/7051* (2013.01); *C12N 15/86* (2013.01); *C12N 2500/05* (2013.01); *C12N 2501/2302* (2013.01); *C12N 2501/602* (2013.01); *C12N 2501/603* (2013.01); *C12N 2501/604* (2013.01); *C12N 2501/606* (2013.01); *C12N 2510/00* (2013.01); *C12N 2760/18843* (2013.01)

(58) Field of Classification Search
CPC ..... C12N 5/0696; C12N 5/0636; C12N 15/86
See application file for complete search history.

(56) References Cited

U.S. PATENT DOCUMENTS

| | | | | |
|---|---|---|---|---|
| 2011/0158954 | A1* | 6/2011 | Ideno | A61P 31/18 435/456 |
| 2012/0135525 | A1* | 5/2012 | Brown | C12N 5/0696 435/377 |
| 2021/0395697 | A1* | 12/2021 | Grewal | C12N 15/86 |

OTHER PUBLICATIONS

CytoTune™—iPS 2.0 Sendai Reprogramming Kit and Cyto Tune™—EmGFP Sendai Fluorescence Reporter FAQs, https://assets.thermofisher.com/TFS-Assets/LSG/brochures/CytoTune-iPS%202%200%20Sendai%20Reprogramming%20Kit%20FAQs.pdf, viewed Mar. 3, 2025.*
Seki et al (Nat Protoc. Mar. 15, 2012;7(4):718-28).*
Fusaki et al., "Efficient induction of transgene-free human pluripotent stem cells using a vector based on Sendai virus, an RNA virus that does not integrate into the host genome," Proceedings of the Japan Academy, Series B 85(8):348-362, 2009. (15 pages).
Non-final Office Action, dated Mar. 28, 2025, for U.S. Appl. No. 16/482,296. (21 pages).

* cited by examiner

*Primary Examiner* — Valarie E Bertoglio
(74) *Attorney, Agent, or Firm* — Seed Intellectual Property Law Group LLP

(57) ABSTRACT

Provided is a method of generating iPS cells. Specifically, provided is a method of generating iPS cells having a rearranged γδ-TCR gene. Also provided is a cell population including the generated iPS cells. The method includes stimulating collected blood cells with IL-2 and a bisphosphonate, and then introducing cell reprogramming factors through use of a Sendai virus (SeV) vector. According to the method of the present invention, iPS cells having a rearranged γδ-TCR gene can be effectively generated. In particular, the method may be free of a step of treating the blood cells with an antibody before the step of stimulating blood cells with any one kind or a plurality of kinds of interleukins selected from IL-2, IL-15, and IL-23, and a bisphosphonate. In addition, iPS cells generated by the method of the present invention can be differentiated into desired cells by differentiation induction treatment.

18 Claims, 15 Drawing Sheets

CRYSTAL VIOLET STAINING

METHOD FOR PRODUCING INDUCED PLURIPOTENT STEM CELLS

TECHNICAL FIELD

The present invention relates to a method of generating induced pluripotent stem cells (iPS cells), and more specifically, to a method of generating iPS cells having a rearranged γδ-TCR gene. The present invention also relates to a cell population including the generated iPS cells.

BACKGROUND ART

T lymphocytes, which attack cancer cells and the like, are broadly classified into αβT cells and TST cells. It is known that the αβT cells are extremely diverse, and αβT cells of a single kind can attack few kinds of cells owing to MHC restriction, whereas TST cells of a single kind attack many kinds of cancer cells in a MHC-unrestricted manner. The TST cells recognize and directly damage many kinds of cancer cells with a single kind of T cell receptor (TCR), and hence T cell infusion therapy using these cells is promising even in gastrointestinal cancer treatment. However, the TST cells are generally present at a proportion of only from 1% to 5% in peripheral blood. Accordingly, there is a problem in that the purity and number of cells sufficient for the treatment cannot be secured by collecting a small amount of blood and activating and/or growing TST cells. In addition, when the amount of blood to be collected from a patient is increased in order to secure the purity and number of cells sufficient for the treatment, there is also a problem in that a tremendous burden is put on the patient. Treatment involving ex vivo expanding γδT cells derived from peripheral blood of a patient and infusing the resultant cells into the patient has already been put into practice. However, such method has not achieved sufficient expansion and activation owing to difficulty in securing the number of cells, and to exhaustion of the cells.

iPS cells are cells that may be established by reprogramming somatic cells by any of various methods. The reprogrammed iPS cells continue to carry gene information used for the reprogramming, and hence it has been of great interest whether or not immune system cells, in particular, terminally differentiated ones that have undergone gene rearrangement, such as B lymphocytes or T lymphocytes, can be reprogrammed. Under such circumstances, there are already reports of establishment of iPS cells from mouse B lymphocytes and establishment of iPS cells from mouse T lymphocytes (Non Patent Literatures 1 and 2).

It has been reported that, when iPS cells are generated from T cells harboring cancer antigen-specific TCR gene rearrangement, and are induced to differentiate, T cells harboring the same rearrangement as the original cells are obtained. However, hitherto established iPS cells having cancer antigen-specific TCRs are each a cell having a particular αβ-TCR, and hence patients who can be treated therewith have been limited because of a small number of kinds of cancers expressing an antigen of interest, and the presence of MHC restriction.

Methods of producing iPS cells from human T cells have been reported (Patent Literatures 1 and 2). In Patent Literature 1, there is a disclosure of a method of generating iPS cells by treating T cells or human CD34+ hematopoietic progenitor cells with a reprogramming factor (cell reprogramming factor). In Patent Literature 2, there is a disclosure that cells are activated with an anti-CD3 antibody and an anti-CD28 antibody in the presence of interleukin-2 (IL-2), and then a cell reprogramming factor is introduced into the T cells through use of a retroviral vector. The methods disclosed in those literatures include, for example, a step of purifying a raw material containing T cells using an affinity column on which a desired antigen is immobilized, or a step of purifying cells having a desired antigen specificity from a human tissue using a tetramer in which a MHC having the desired antigen attached thereto is tetramerized (so-called MHC tetramer). In addition, there is a disclosure that all TCR genes of the iPS cells generated in Patent Literature 1 harbored TCR-β rearrangement, that is, the iPS cells are derived from αβT cells.

Methods of preparing γδT cells from peripheral blood are reported in Patent Literatures 3 to 5. In this case, the γδT cells are prepared using IL-2, a bisphosphonate, and the like, but there is no mention of preparation of iPS cells.

There is a demand for a method of effectively preparing γδT cells capable of attacking many kinds of cancer cells in a MHC-unrestricted manner.

CITATION LIST

Non Patent Literature

[NPL 1] Cell, 2008, Vol. 133 No. 2, 250-264
[NPL 2] Nature, 2009, Vol. 460, 1132-1135

Patent Literature

[PTL 1] JP 2012-528599 A
[PTL 2] WO 2011/096482 A1
[PTL 3] WO 2006/006720 A1
[PTL 4] JP 2005-517440 A
[PTL 5] JP 2013-176403 A

SUMMARY OF INVENTION

Technical Problem

An object of the present invention is to provide a method of generating iPS cells. Specifically, the object is to provide a method of generating iPS cells having a rearranged γδ-TCR gene. Another object of the present invention is to provide a cell population including the generated iPS cells.

Solution to Problem

The inventor of the present invention has made extensive investigations in order to achieve the above-mentioned objects, and as a result, has found that the objects can be achieved by stimulating blood cells with IL-2 and a bisphosphonate, and then introducing genes capable of expressing cell reprogramming factors into the blood cells through use of a Sendai virus (SeV) vector. Thus, the inventor has completed the present invention.

That is, the present invention includes the following.
1. A method of generating iPS cells, including the following steps 1) to 3):
   1) stimulating collected blood cells with any one kind or a plurality of kinds of interleukins selected from IL-2, IL-15, and IL-23, and a bisphosphonate;
   2) introducing at least four kinds of genes capable of expressing cell reprogramming factors into the blood cells through use of a Sendai virus vector; and
   3) culturing the cells having introduced therein the genes.

2. The method of generating iPS cells according to the above-mentioned item 1, wherein the cell reprogramming factors include OCT3/4, SOX2, KLF4, and c-MYC.

3. The method of generating iPS cells according to the above-mentioned item 1 or 2, wherein the interleukins include IL-2.

4. The method of generating iPS cells according to any one of the above-mentioned items 1 to 3, wherein the bisphosphonate includes one kind or a plurality of kinds selected from zoledronic acid, pamidronic acid, alendronic acid, risedronic acid, ibandronic acid, incadronic acid, etidronic acid, minodronic acid, salts thereof, and hydrates thereof.

5. The method of generating iPS cells according to any one of the above-mentioned items 1 to 4, wherein the blood cells include peripheral blood mononuclear cells.

6. The method of generating iPS cells according to any one of the above-mentioned items 1 to 5, wherein the blood cells include cells of human origin.

7. The method of generating iPS cells according to any one of the above-mentioned items 1 to 6, wherein the method is free of a step of treating the collected blood cells with an antibody before the steps 1) to 3).

8. The method of generating iPS cells according to any one of the above-mentioned items 1 to 7, wherein the iPS cells include iPS cells having a rearranged γδ-TCR gene.

9. A cell population, including iPS cells generated by the method of generating iPS cells of any one of the above-mentioned items 1 to 8.

10. Blood progenitor cells, which are obtained by inducing differentiation of iPS cells generated by the method of generating iPS cells of any one of the above-mentioned items 1 to 8.

Advantageous Effects of Invention

According to the method of the present invention, iPS cells having a rearranged γδ-TCR gene can be effectively generated. More specifically, according to the method of generating iPS cells of the present invention, iPS cells can be generated through the steps of: 1) stimulating collected blood cells with IL-2 and a bisphosphonate; 2) introducing at least four kinds of genes capable of expressing cell reprogramming factors into the blood cells through use of a SeV vector; and 3) culturing the cells having introduced therein the genes. In particular, the method may be free of the step of treating the blood cells with an antibody or the like before the steps 1) to 3). According to the method of the present invention, desired iPS cells can be effectively generated without the generation of iPS cells from cells obtained by recovering rearranged γδ-TCR gene-positive cells from blood cells through, for example, antibody treatment against a γδ-TCR using a technique such as a cell sorter. Further, the iPS cells generated by the method of the present invention can be differentiated into blood progenitor cells by differentiation induction treatment. The step of performing treatment with an antibody or the like can be omitted, and hence the method of the present invention is excellent in that an operation for, for example, removing the antibody from the generated cell population is also not required.

BRIEF DESCRIPTION OF DRAWINGS

FIG. 6 is an image for showing results confirming the rearrangement of each of Vγ9 and Vδ2 genes (Experimental Example 1-1).

FIG. 20A is a diagram for illustrating a differentiation induction protocol, FIG. 20B are graphs for showing results of analysis of APJ, which is known to be a cell surface marker for early hematovascular progenitor cells, on day 4 after the initiation of differentiation induction by flow cytometry, and FIG. 20C are graphs for showing results of analysis of the cell surface marker on day 12 after the initiation of differentiation induction by flow cytometry (Experimental Example 1-5).

FIG. 21A is a graph for showing results of analysis of the proportion of γδT cells by flow cytometry in the case where blood cells were treated with a bisphosphonate and IL-2 for 4 days, and FIG. 21B is an image for showing results confirming the rearrangement of each of Vγ9 and Vδ2 genes in three among seven iPS cell lines established from a cell population having a proportion of γδT cells of 3.73% (the one shown in FIG. 21A) (i.e., the cells were confirmed to be γδT cell-derived iPS cells) (Example 2).

FIG. 22C is a graph for showing results obtained by staining the cells on day 13 of differentiation culture by the above-mentioned method with fluorescence-labeled antibodies against CD34 and CD43, and analyzing the formation of hematopoietic progenitor cells (CD34+/CD43+) by flow cytometry (Experimental Example 2-1).

DESCRIPTION OF EMBODIMENTS

Figure 1:
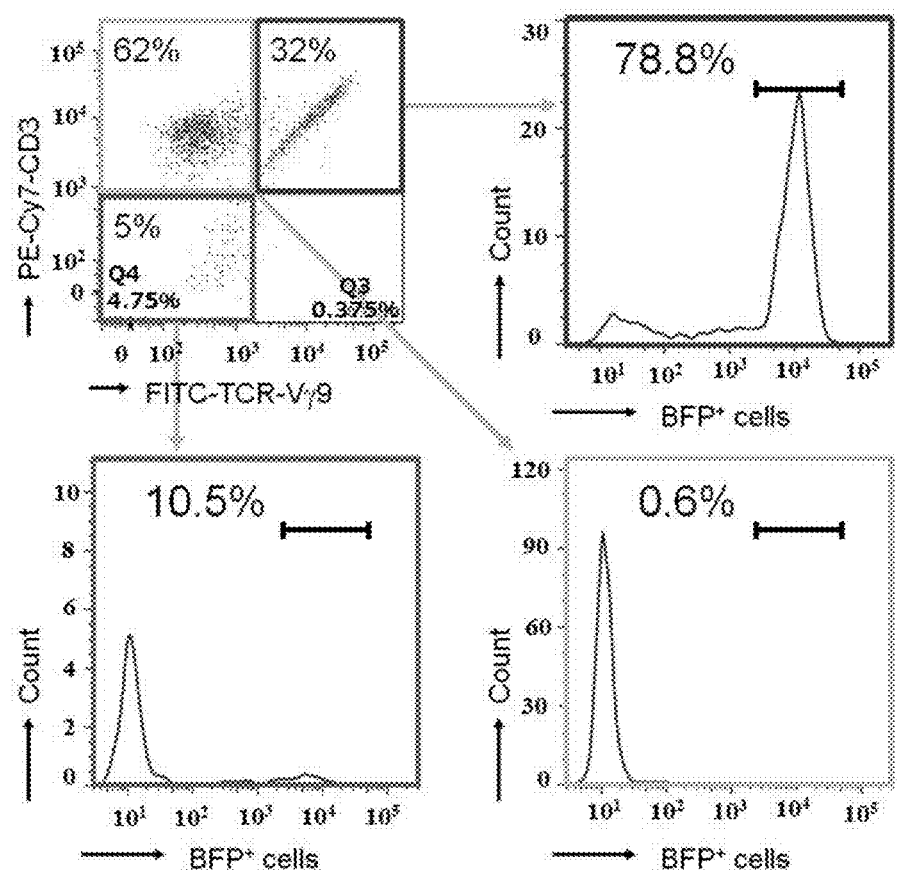
FIG. 1 are: a graph for showing results obtained by treating blood cells with a bisphosphonate and IL-2, then staining the cells with an anti-CD3 antibody (marker for T lymphocytes) and an anti-Vγ9 antibody (marker for γδT lymphocytes), and analyzing the kinds of T cells by flow cytometry (upper left graph); and graphs for showing results of confirmation of SeV introduction efficiency for each subset by flow cytometry using the expression of BFP as an indicator (lower left, and upper and lower right graphs) (Reference Example 1).

The present invention relates to a method of generating iPS cells, and more specifically, to a method of generating iPS cells having a rearranged γδ-TCR gene. The present invention also relates to a cell population including the generated iPS cells. More specifically, the present invention relates to a method of generating iPS cells, including the following steps 1) to 3):

1) stimulating collected blood cells with IL-2 and a bisphosphonate;
2) introducing at least four kinds of genes capable of expressing cell reprogramming factors into the blood cells through use of a SeV vector; and
3) culturing the cells having introduced therein the genes.

As used herein, the term "γδT cells" refers to T cells having a peculiar T cell receptor (TCR) made up of a γ-chain and a δ-chain on the surface thereof. Most T cells have a TCR made up of two glycoprotein chains called an αTCR chain and a βTCR chain, and γδT cells account for about 5% of all T cells.

As used herein, the term "rearranged γδ-TCR gene" refers to a gene encoding a T cell receptor (TCR) in which both of the rearrangement of a TCRG region and the rearrangement of a TCRD region have occurred. The TCRG region is made up of Vγ-Jγ, and the TCRD region is made up of Vδ-Dδ-Jδ.

As used herein, the term "iPS cells" refers to undifferentiated cells established by reprogramming somatic cells by any of various methods.

As used herein, the term "blood cells" refers to cells in general that are cells derived from blood and can serve as a starting material for generating iPS cells. For example, the blood cells are suitably peripheral blood mononuclear cells, and may include all forms of blood cells existing on an entire differentiation process from hematopoietic stem cells to final differentiation into peripheral blood. Specific examples thereof include hematopoietic stem cells, lymphoid stem cells, lymphoid dendritic cell progenitor cells, lymphoid dendritic cells, T lymphocyte progenitor cells, T cells, B lymphocyte progenitor cells, B cells, plasma cells, NK progenitor cells, NK cells, myeloid stem cells, myeloid dendritic cell progenitor cells, myeloid dendritic cells, mast cell progenitor cells, mast cells, basophil progenitor cells, basophils, eosinophil progenitor cells, eosinophils, granulocyte progenitor cells, macrophage progenitor cells, monocytes, macrophages, osteoclast progenitor cells, osteoclasts, neutrophil progenitor cells, neutrophils, megakaryocyte progenitor cells, megakaryocytes, platelets, early erythroid progenitor cells, late erythroid progenitor cells, and erythrocytes in the lineage hierarchy of embryonic stem cells to blood cells. For example, the peripheral blood mononuclear cells may be obtained from collected blood by a method known per se, or any method to be developed in the future. For example, the peripheral blood mononuclear cells can be easily separated by subjecting collected blood to density centrifugation. The origin of the blood cells to be used in the method of the present invention may be appropriately selected depending on the intended use of cells and is not particularly limited, but for example, blood cells of mammalian origin are suitable. In addition, when the iPS cells of the present invention, or cells obtained by subjecting the iPS cells to differentiation induction treatment are to be administered to humans, the blood cells to be used are suitably cells of human origin.

1) Step of stimulating collected blood cells with any one kind or plurality of kinds of interleukins selected from IL-2, IL-15, and IL-23, and bisphosphonate In the method of generating iPS cells of the present invention, the collected blood cells need to be stimulated with any one kind or a plurality of kinds of interleukins selected from IL-2, IL-15, and IL-23, and a bisphosphonate. Stimulation with the interleukin and stimulation with the bisphosphonate may be simultaneously performed or may be separately and sequentially performed. For example, when the blood cells are cultured, the culture may be performed using a medium containing the interleukin and the bisphosphonate. In this case, the concentration of the interleukin to be added to the medium may be set to from 50 IU/mL to 200 IU/mL, preferably from 75 IU/mL to 150 IU/mL, more preferably 100 IU/mL. In addition, the concentration of the bisphosphonate to be added to the medium may be set to from 1 μM to M, preferably from 1 μM to 10 μM, more preferably 5 M. For example, the stimulation may be performed by culturing the cells in a medium containing the bisphosphonate for from 1 day to 7 days, and then adding a medium containing the interleukin. Herein, examples of the bisphosphonate that may be used include zoledronic acid, pamidronic acid, alendronic acid, risedronic acid, ibandronic acid, incadronic acid, etidronic acid, minodronic acid, salts thereof, and hydrates thereof. For the bisphosphonate stimulation, one kind or a plurality of kinds of bisphosphonates selected therefrom may be used.

RPMI 1640 medium, minimal essential medium (α-MEM), Dulbecco's modified Eagle's medium (DMEM), F12 medium, or the like may be used as a medium in which the blood cells are cultured and to which the one kind or plurality of kinds of interleukins selected from IL-2, IL-15, and IL-23, and the bisphosphonate are added. In addition to the interleukin and the bisphosphonate, for example, an amino acid required for culture (e.g., L-glutamine) and antibiotics (e.g., streptomycin and penicillin) may be added to the medium. In addition, as required, fetal calf serum (FCS) may be added.

A culture period in the medium containing the interleukin and the bisphosphonate described above only needs to be a period in which the cells grow to a number of cells needed for the introduction of the cell reprogramming factors thereinto, and is not particularly limited, but is generally from 2 days to 14 days, and is preferably from 2 days to 7 days from the viewpoint of gene introduction efficiency. From the viewpoint of gene introduction efficiency, the culture may be performed using a culture dish coated with a fibronectin fragment (RetroNectin™) or the like. IL-2 is particularly preferred as the one kind or plurality of kinds of interleukins selected from IL-2, IL-15, and IL-23.

2) Step of Introducing Genes Capable of Expressing Cell Reprogramming Factors into the Blood Cells Through Use of SeV Vector As used herein, the term "cell reprogramming factors" refers to factors to be used in the generation of iPS cells. The cell reprogramming factors are not particularly limited as long as the factors can, when introduced into the blood cells, impart pluripotency to the somatic cells alone or in synergy with another pluripotency factor. Specifically, at least four kinds of proteins selected from the group consisting of OCT3/4, SOX2, KLF4, c-MYC, KL5, LIN28, Nanog, ECAT1, ESG1, Fbxl5, ERas, ECAT7, ECAT8, Gdf3, Soxl5, ECAT-15-1, ECAT15-2, Fthl17, Sal14, Rex1, Utfl, Tcl1, Stella, β-catenin, Stat3, and Grb2 are preferred. Further, of those proteins, from the viewpoint of allowing iPS cells to be efficiently established with a small number of factors, OCT3/4, SOX2, KLF4, and c-MYC (four factors) are suitable. In addition, herein, examples of the "genes capable of expressing" include nucleic acids, such as cDNAs, encoding proteins of interest. In the present invention, a SeV vector carrying the genes expressing the cell reprogramming factors is used.

SeV is a virus belonging to the family Paramyxoviridae of the order Mononegavirales and having an RNA genome. The SeV has an envelope formed of a lipid bilayer having a diameter of about 200 nm, and a genome of a single-stranded nonsegmented minus-strand RNA of 15,384 bases in the form of a nucleoprotein complex inside the envelope, which encodes six kinds of genes (N, P, M, F/HN, and L from replication and transcription upstream) and a plurality of accessory genes. Its characteristic genes are genes for hemagglutinine neuraminidase (HN), fusogenic protein (F), and L. Expressed protein HN recognizes sialic acid on a cell surface to tether a viral particle in the attachment of SeV to a cell, and F is cleaved and activated by an extracellular protease and catalyzes fusion between the envelope of the tethered SeV and the cell membrane of the target cell to establish infection. Unlike retroviruses, such as murine leukemia viruses and human immunodeficiency viruses, which are also RNA viruses, the conversion of genomic RNA to DNA does not occur in the infected cell, and the SeV genome remains in the cytoplasm as RNA and is not incorporated into chromosomal DNA in the nucleus. In the present invention, an F-deficient SeV vector carrying the genes capable of expressing the cell reprogramming factors is suitably used to introduce the genes into the blood cells.

In addition, in the present invention, a method of "introducing genes capable of expressing cell reprogramming factors into the blood cells" is not particularly limited, and a known technique may be appropriately selected and used. For example, when introduced in the form of genes related to the cell reprogramming factors into the blood cells, the genes (e.g., cDNAs) are inserted into an appropriate expression vector containing a promoter that functions in blood cells, and the expression vector may be introduced into the cells by infection, a lipofection method, a liposome method, an electroporation method, a calcium phosphate coprecipitation method, a DEAE-dextran method, a microinjection method, or an electroporation method.

Examples of the promoter to be used in such SeV vector include a SRα promoter, a SV40 promoter, a LTR promoter, a CMV promoter, a RSV promoter, and a HSV-TK promoter. In addition, such promoter may be capable of regulating the expression of a gene inserted downstream of the promoter on the basis of, for example, the presence or absence of a drug (e.g., tetracycline). The expression vector may further contain, in addition to the promoter, for example, an enhancer, a poly(A) addition signal, a selectable marker gene (e.g., neomycin resistance gene), or a SV40 replication origin.

In addition, in the present invention, conditions at the time of or after "introducing cell reprogramming factors into the blood cells" are not particularly limited, but the blood cells having introduced therein the cell reprogramming factors may be cultured on a feeder cell layer. Such feeder cells are not particularly limited, but examples thereof include murine embryonic fibroblasts (MEFs), STO cells, and SNL cells whose cell division has been stopped by irradiation with a radiation or antibiotic treatment. Further, from the viewpoint of suppressing cellular differentiation in the process of inducing the blood cells into iPS cells, it is suitable that basic fibroblast growth factor (bFGF) be added to the medium at the time of or after the introduction of the cell reprogramming factors into the blood cells. In addition, culture may be performed without the use of feeder cells, by applying a method known per se or a method to be developed in the future to, for example, a method of treating a medium or culture dish to be used. For example, a basement membrane matrix, laminin, vitronectin, or the like may be used by coating the culture dish or by being incorporated into the medium. As the laminin, for example, commercially available iMatrix-511 (Nippi) formed of a recombinant protein having a sequence identical to that of laminin-511-E8 fragment may be used.

In order to further enhance the establishment efficiency of iPS cells, at the time of or after the introduction of the cell reprogramming factors into the blood cells, for example, TGF-β, a histone deacetylase (HDAC) inhibitor, a G9a histone methyltransferase inhibitor, or a p53 inhibitor may be added to the medium. As the HDAC inhibitor, for example, a low-molecular-weight inhibitor such as valproic acid (VPA), trichostatin A, sodium butyrate, MC 1293, or M344, siRNA against HDAC, or the like may be used. As the G9a histone methyltransferase inhibitor, a low-molecular-weight inhibitor such as BIX-01294, siRNA against G9a, or the like may be used. As the p53 inhibitor, a low-molecular-weight inhibitor such as Pifithrin-α, siRNA against p53, or the like may be used.

3) Step of Culturing Cells Having Introduced Therein Genes

It is preferred to culture the cells while gradually replacing a known medium suited for the culture of the blood cells with a medium suited for the culture of iPS cells along with a transition from the blood cells to the iPS cells. As such medium suited for the culture of iPS cells, a known medium may be appropriately selected and used. For example, serum or a serum replacement may be used for a commercially available basal medium for mammalian cells, such as DMEM and/or DMEM/F12. As an example of the serum replacement, for example, KnockOut™ Serum Replacement: KSR (ThermoFisher, SCIENTIFIC) may be used. A medium obtained by adding KSR to DMEM is referred to as "KSR/DMEM medium". In addition, a commercially available primate ES cell medium or primate ES/iPS cell medium, or the like may be used. In each of those media, an additive known per se that is suited for the culture of pluripotent stem cells, such as ES cells or iPS cells, for example, one kind or a plurality of kinds of additives selected from an N2 supplement, a B27™ supplement, insulin, bFGF, activin A, heparin, a ROCK (Rho-associated coiled-coil forming kinase/Rho-binding kinase) inhibitor, and a GSK-3 inhibitor may be added at an appropriate concentration.

Of the iPS cells thus derived from the blood cells, in particular, iPS cells having a rearranged γδ-TCR gene may be recovered by appropriately selecting a technique known per se. Examples of such known technique include: a method as described in Examples to be described later, involving observing the morphology of ES cell colonies under a microscope to select the iPS cells; and a method involving using recombinant blood cells targeting a drug resistance gene or a reporter gene (e.g., GFP gene) in the locus of a gene known to be specifically expressed in iPS cells (e.g., the cell reprogramming factors) and selecting the iPS cells using drug resistance or reporter activity as an indicator.

The thus selected cells may be confirmed to be iPS cells by, for example, a method as described in Examples to be described later, involving detecting the expression of an undifferentiation cell-specific marker in the selected cells by immunostaining, RT-PCR, or the like, or a method involving implanting the selected cells into a mouse, and observing teratoma formation therein. A timing at which those cells are selected and recovered may be appropriately determined through observation of the growth state of colonies, and is generally from 14 days to 28 days after the introduction of the cell reprogramming factors into the blood cells.

According to the method of generating iPS cells of the present invention, the method may be free of the step of treating blood cells with an antibody or the like before the following steps 1) to 3): 1) stimulating collected blood cells with IL-2 and a bisphosphonate; 2) introducing at least four kinds of genes capable of expressing cell reprogramming factors into the blood cells through use of a SeV vector; and 3) culturing the cells having introduced therein the genes. According to the method of the present invention, desired iPS cells can be effectively generated without the generation of iPS cells from cells obtained by recovering rearranged γδ-TCR gene-positive cells from blood cells through, for example, antibody treatment against a γδ-TCR using a technique such as a cell sorter. Herein, examples of the antibody treatment or the like include treatment with an affinity column having immobilized thereto a desired antigen and treatment using a MHC tetramer. Besides, the step of performing treatment with an antibody or the like can be omitted, and hence the method of the present invention is excellent in that an operation for, for example, removing the antibody with which the treatment has been performed is also not required.

The present invention also encompasses a cell population including iPS cells generated by the above-mentioned method. The iPS cells generated by the method of the present invention contain a rearranged γδ-TCR gene, and contain 100 IU/mL of IL-2. In addition, when blood cells are treated with an antibody or the like, the antibody with which the treatment has been performed remains in the cell population including the generated iPS cells in some cases, and hence there is a risk of side effects due to the antibody. However, according to the method of the present invention, the risk of such side effects is eliminated.

γδT cells may be generated by treating the iPS cells generated by the method of the present invention by a method known per se or any differentiation induction treatment method to be developed in the future. The γδT cells produced by the method of the present invention have an excellent immune function, and hence can be used for, for example, the treatment or prevention of a disease, such as a tumor, an infectious disease, or an autoimmune disorder. Further, the γδT cells produced by the method of the present invention may be utilized as a pharmaceutical composition containing the T cells, and are also expected to be applicable to an immune cell treatment method involving using the T cells. The pharmaceutical composition containing the γδT cells obtained by subjecting the iPS cells obtained by the method of generating iPS cells of the present invention to differentiation induction treatment may be prepared through formulation by a known pharmaceutical method. The pharmaceutical composition may be mainly parenterally used, for example, as a capsule, a liquid, a film coating agent, a suspension, an emulsion, or an injection (e.g., an intravenous injection or a drip injection).

In such formulation, a pharmacologically acceptable carrier or medium, specifically, sterile water or physiological saline, a vegetable oil, a solvent, a base, an emulsifier, a suspending agent, a surfactant, a stabilizer, a vehicle, an antiseptic agent, a binder, a diluent, a tonicity agent, a soothing agent, an extender, a disintegrant, a buffer, a coating agent, a lubricant, a colorant, a solubilizing agent, other additives, or the like may be appropriately combined. In addition, the pharmaceutical composition may be used in combination with, for example, a known pharmaceutical composition or immunostimulator to be used for the treatment or prevention of the above-mentioned disease. When the pharmaceutical composition of the present invention is administered, its dose is appropriately selected depending on, for example, the age, body weight, symptoms, and health status of a subject, and the kind of the composition (e.g., a pharmaceutical or a food or drink).

EXAMPLES

The present invention is specifically described below by way of Reference Example, Examples, and Experimental Examples for a better understanding of the present invention. Needless to say, however, the present invention is by no means limited to these Examples and the like.

Reference Example 1

In this Reference Example, human peripheral blood mononuclear cells (human PBMCs) were treated with a bisphosphonate and IL-2, and the resultant cells were treated with a Sendai virus vector (SeV-BFP vector) carrying a gene expressing blue fluorescent protein (hereinafter "BFP"), followed by the analysis of the introduced gene.
1) Separation of PBMCs of Healthy Volunteers Blood was collected from the peripheral vein of healthy volunteers using blood collection tubes for mononuclear cell separation (Vacutainer™, BD). After the blood collection, centrifugal treatment was performed and a PBMC fraction was recovered by a density gradient centrifugation method.
2) Stimulated Culture of γδT Cells The PBMCs obtained in 1) above were cultured at 37° C. using a basal medium (RPMI 1640 medium containing 10% FCS, 100 U/mL penicillin, and 100 g/mL streptomycin) containing 5 μM zoledronic acid (Zometa™) as a bisphosphonate. The cells were added to a culture vessel at $2 \times 10^6$ cells/mL in an amount of 1 mL and cultured. From the day after the initiation of culture, a basal medium containing 100,000 IU/mL of IL-2 was added every day at 1 μL per 1 mL of the culture medium. Every 1 to 3 days, a basal medium containing IL-2 was added in an amount equal to that of the culturing medium and the whole was pipetted, and then the cells were passed to a 2-fold scale.

3) The PBMCs subjected to stimulated culture in the medium containing the bisphosphonate and IL-2 for 4 days by the method of 2) above were infected with a SeV-BFP vector at an MOI of 10.

4) After 2 days from the infection, the cultured PBMCs were observed with a fluorescence microscope, and as a result, it was confirmed that the cells were stained with BFP.

5) Analysis by Flow Cytometry

After 2 days from the infection, the cultured PBMCs were stained with an anti-CD3 antibody and an anti-TCR-Vγ9 antibody each labeled with a fluorochrome, and were analyzed by flow cytometry. CD3 is a marker for T lymphocytes, and TCR-Vγ is the expressed protein of a rearranged γδ-TCR gene. It may be said that CD3-positive and TCR-Vγ9-positive cells are γδT cells, CD3-positive and TCR-Vδ-negative cells are other T cells different from γδT cells, and CD3-negative and TCR-Vγ9-negative cells are mononuclear cells in peripheral blood other than T cells. As a result, γδT cells were obtained at a proportion of 32% by the above-mentioned treatment, and 78.8% thereof were BFP-positive. Meanwhile, 0.6% of the CD3-positive and TCR-Vδ-negative cells (i.e., other T cells different from γδT cells) and 10.5% of the CD3-negative and TCR-Vγ9-negative cells (i.e., mononuclear cells in peripheral blood other than T cells) were BFP-positive (FIG. 1).
6) The experiment was performed three times in the system of 1) to 5) above, and the results thereof were summarized (FIG. 2A to FIG. 2C).

Figure 2:
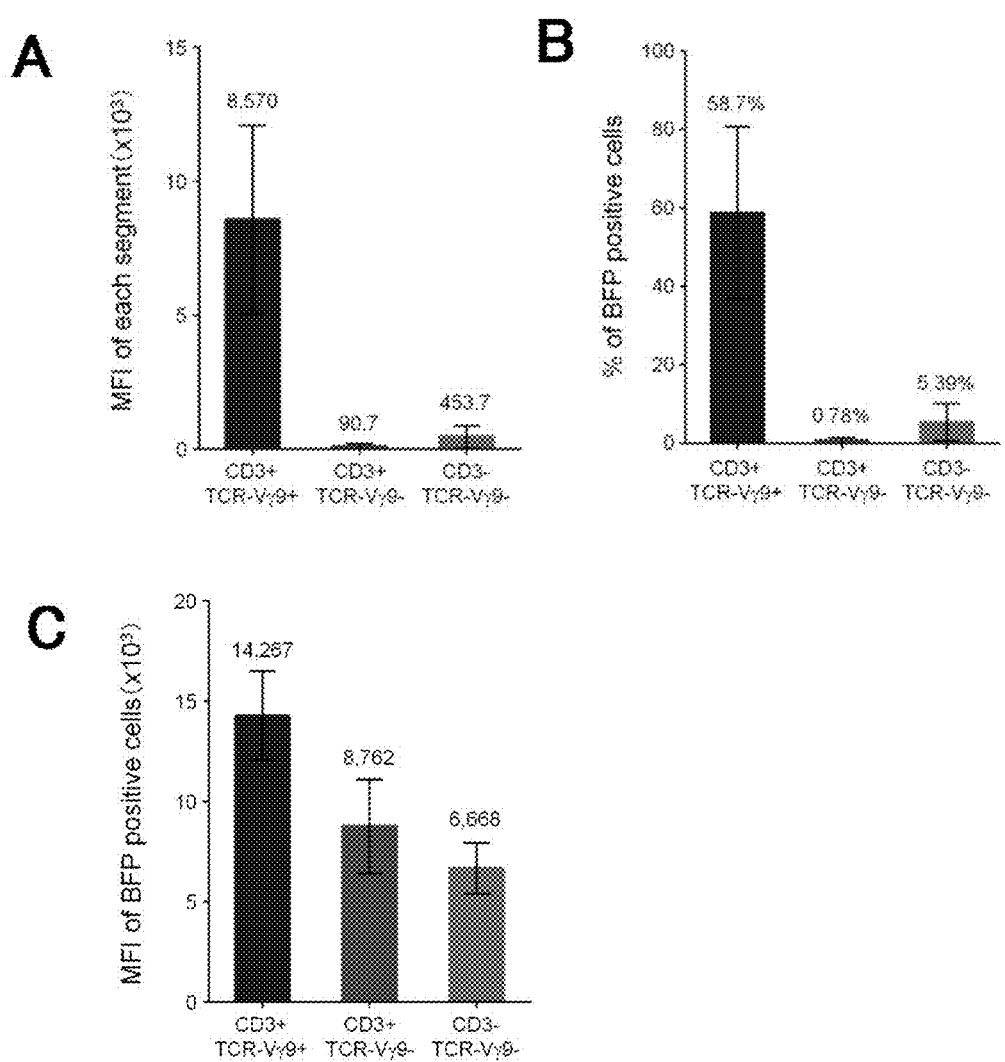
FIG. 2 are graphs for showing results of measurement of the mean fluorescence intensity of BFP (FIG. 2A), the proportion of BFP-positive cells (FIG. 2B), and the mean fluorescence intensity of BFP in the BFP-positive cells (FIG. 2C) by performing the experiment of FIG. 1 three times (Reference Example 1).

In FIG. 2A, the mean fluorescence intensity of BFP is shown, and in FIG. 2B, the proportion of BFP-positive cells is shown. In addition, in FIG. 2C, the mean fluorescence intensity of BFP in the BFP-positive cells is shown. The results confirmed that BFP was dominantly introduced into the γδT cells. That is, it was suggested that the SeV vector was capable of dominantly introducing genes into the γδT cells.

Example 1

Figure 3:
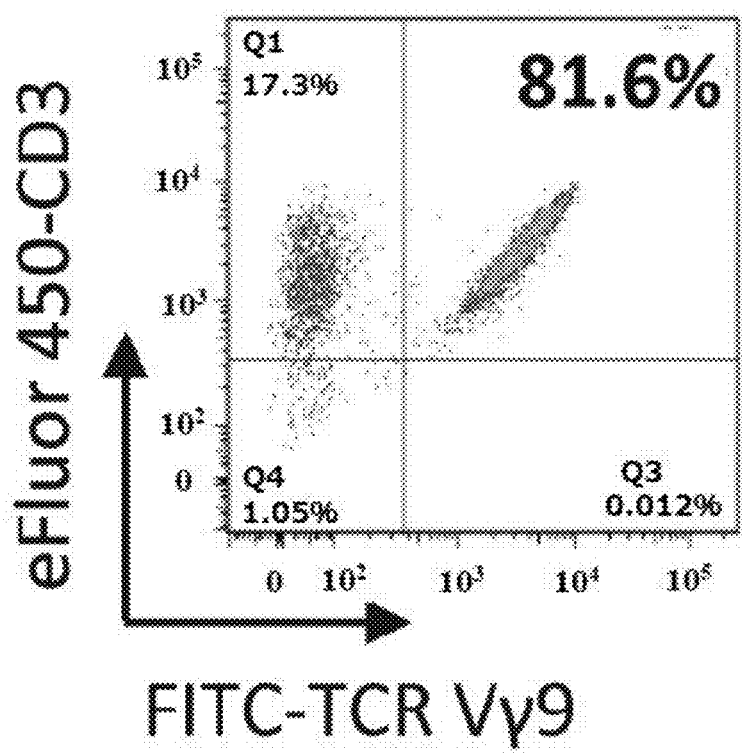
FIG. 3 is a graph for showing results of analysis of the proportion of γδT cells by flow cytometry in the case where blood cells were treated with a bisphosphonate and IL-2 for 13 days (Example 1).

In this Example, cells obtained by treating and culturing human PBMCs with a bisphosphonate and IL-2 for 13 days by the same technique as in Reference Example 1 were treated with a SeV vector carrying genes expressing OCT3/4, SOX2, KLF4, and C-MYC. Next, the cells were cultured in a culture vessel coated with iMatrix-511 (Nippi) using an iPS/ES cell medium (StemFit™ medium (Ajinomoto)), and the resultant cells were analyzed. As the SeV vector, CytoTune™-iPS2.0 (MBL) was used. The cell population treated for 13 days as described above was analyzed by flow cytometry, and as a result, the proportion of γδT cells was found to be 81.3% (FIG. 3).

The human PBMCs treated with the bisphosphonate and IL-2 were subjected to infection treatment with CytoTune™-iPS (MBL) at an MOI of 10, 20, or 30 at 37° C. in accordance with the specifications. The day after the infection, the PBMCs were seeded into a culture dish coated with iMatrix-511 (Nippi) at a number of cells of $2 \times 10^4$. In this case, a medium obtained by incorporating 100 IU/mL of IL-2 into the basal medium described in Reference Example 1 was used.

Figure 4:
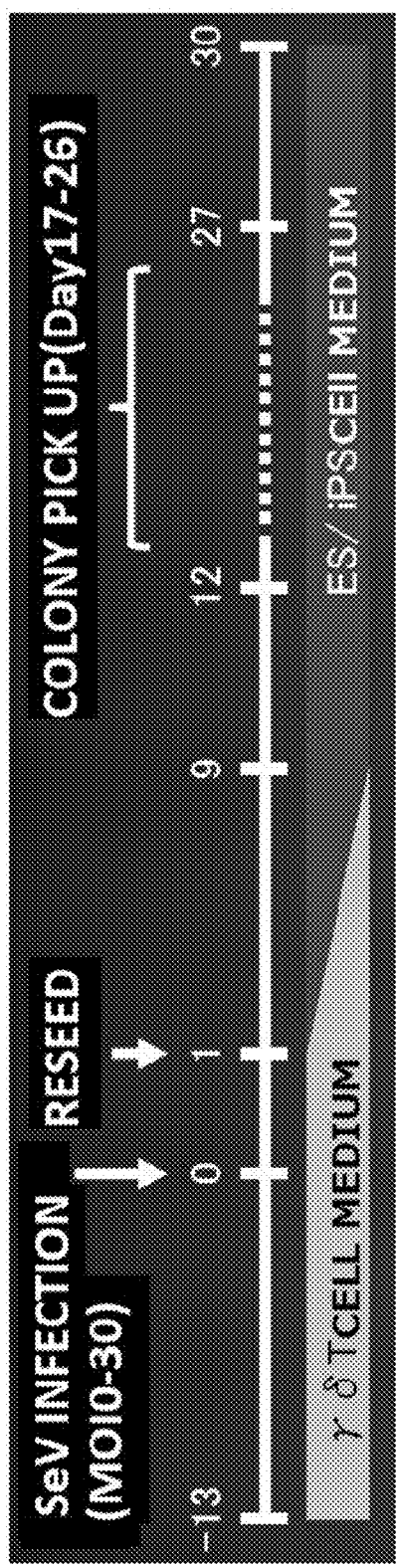
FIG. 4 is a diagram for illustrating an experimental protocol of Example 1 (Example 1).

In accordance with an experimental protocol of FIG. 4, on days 3, 5, and 7 after the infection, StemFit™ medium (Ajinomoto) was added to the culture dish. From day 9 after the infection, the medium was replaced with StemFit™ medium every 2 days. Formed human ES cell-like colonies were observed under a stereoscopic microscope.

Figure 5:
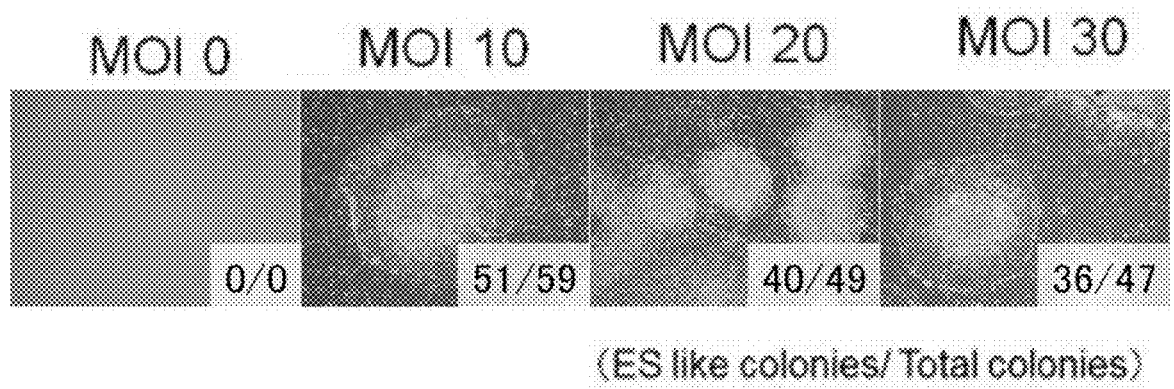
FIG. 5 are photographs for showing formation of ES cell-like colonies in the case where cell reprogramming factors were introduced into blood cells through use of a SeV vector, and the cells were cultured using an iPS/ES cell medium (StemFit™ medium (Ajinomoto)) (Example 1).

In FIGS. 5, typical phase-contrast micrographs of colonies that appeared are shown. Numbers in FIGS. 5 represent "number of ES cell-like colonies/number of total colonies." Thus, the appearance of ES cell-like colonies in each culture dish was confirmed. Cells constituting ES cell-like colonies are hereinafter referred to as "iPS cells".

Experimental Example 1-1

Figure 6:
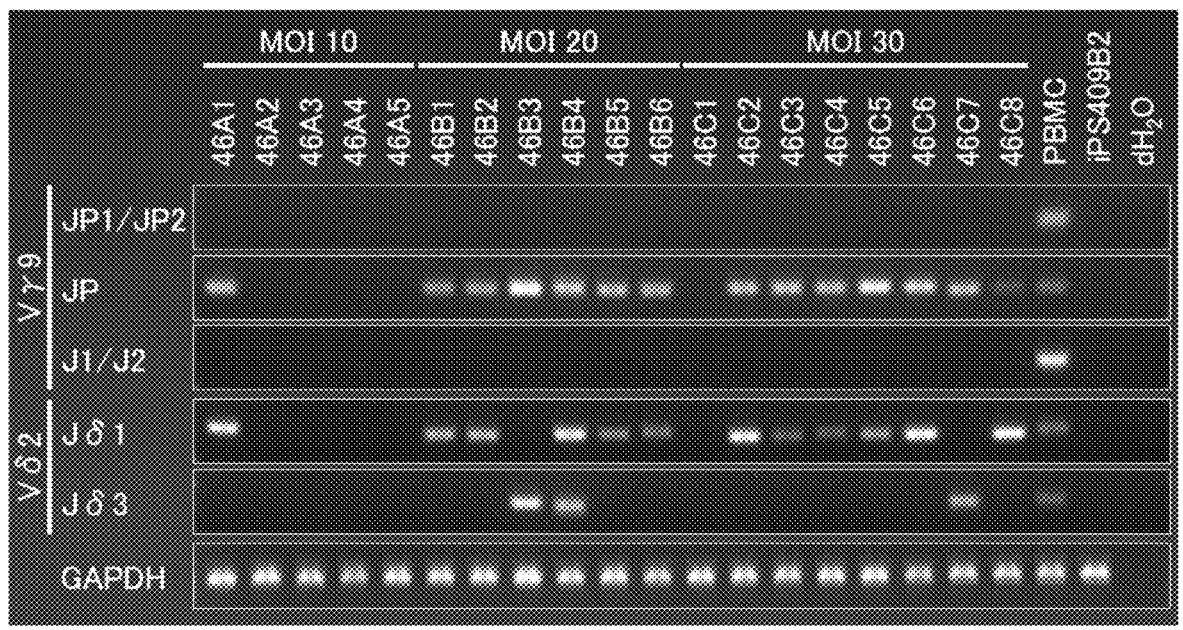
FIG. 6 is an image for showing results of confirmation of the presence of rearranged genes in each iPS cell line generated in Example 1 by genomic PCR.
Figure 7:
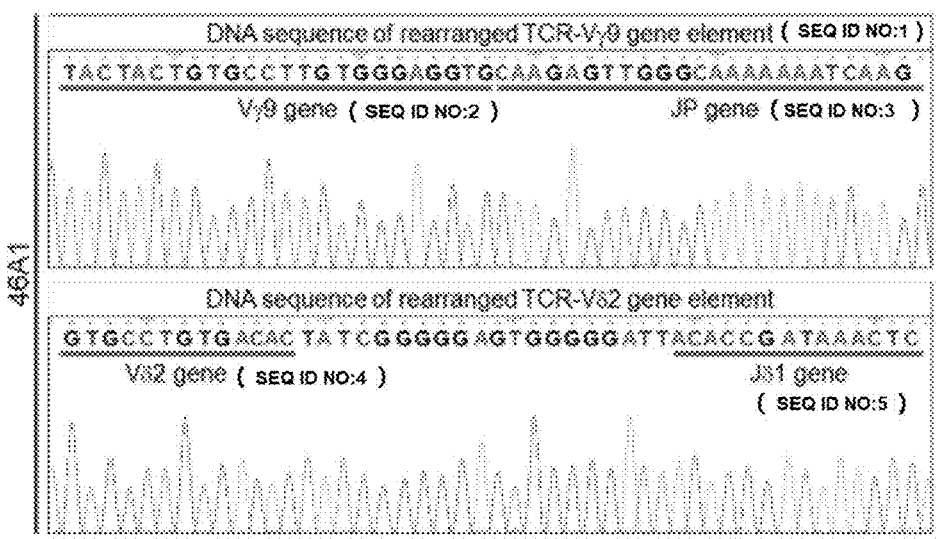
FIG. 7 is a figure for showing results of confirmation of the base sequence of an amplified product of each rearranged gene (Experimental Example 1-1).

In this Experimental Example, the iPS cells generated in Example 1 were subjected to genetic analysis by the following method.
   1) Genomic DNA was extracted from the iPS cells generated in Example 1.
   2) It was confirmed whether the genomic DNA obtained in 1) above harbored the rearrangement of each of Vγ9 and Vδ2 genes. The genome of PBMCs including γδT cells serving as a positive control, and the genome of iPS409B2, a cell line harboring no TCR gene rearrangement, serving as a negative control were also similarly analyzed. As a result, bands of Vγ9 and Vδ2 were found in the system infected at an MOI of 10, 20, or 30, confirming that each of the Vγ9 and Vδ2 genes was rearranged (FIG. 6).
   3) The base sequence of an amplified product of the rearrangement of each of the Vγ9 and Vδ2 genes was confirmed (FIG. 7).

Experimental Example 1-2

Figure 8:
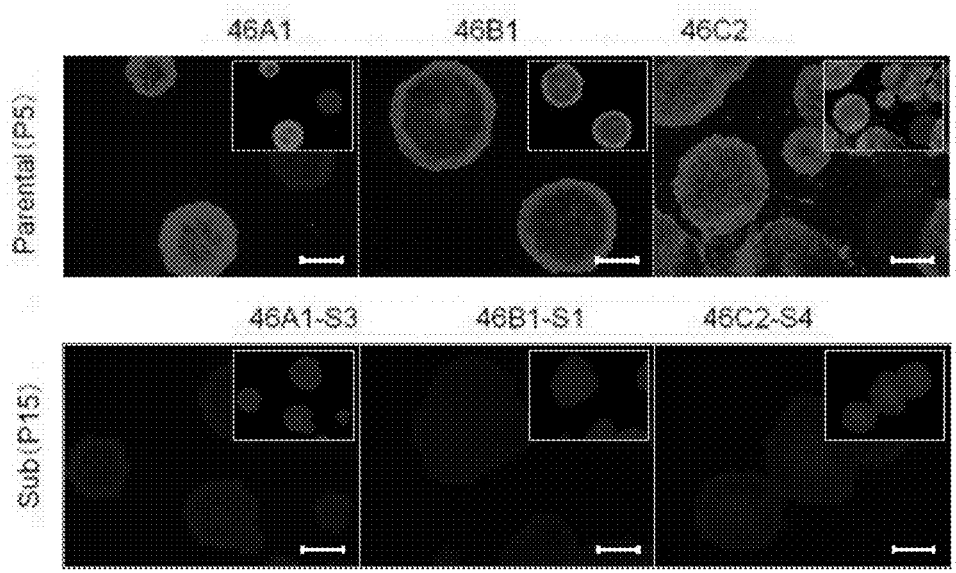
FIG. 8 are photographs for showing results of confirmation of the presence of SeV in the cells generated in Example 1 (upper row of FIGS. 8) and SeV-negative subcloned cells (lower row of FIGS. 8) (Experimental Example 1-2).

In this Experimental Example, the presence or absence of SeV was confirmed for the iPS cells generated in Example 1. The iPS cells were immunostained for SeV. The cells were positive for the virus (upper row of FIG. 8). SeV is temperature-sensitive, and hence the iPS cells were cultured at 39° C. for 5 days, but SeV did not completely disappear. Therefore, SeV-negative colonies out of the above-mentioned cells were confirmed, and three kinds of lines (46A1, 46B1, and 46C2) were subcloned. The subclones were immunostained for SeV, and as a result, were found to be negative (lower row of FIG. 8).

Figure 9:
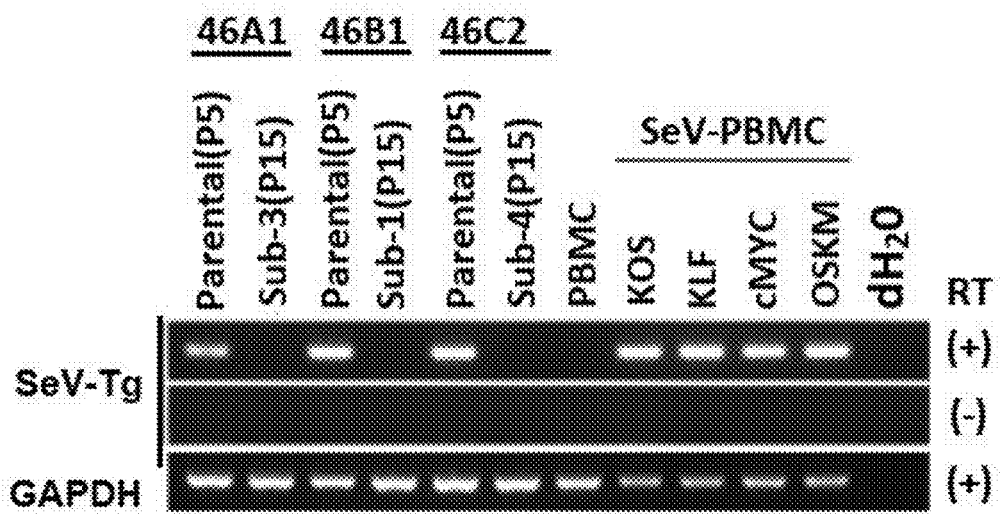
FIG. 9 is an image for showing results of confirmation of the presence of SeV in each iPS cell line generated in Example 1 by RT-PCR (Experimental Example 1-2).
Figure 10:
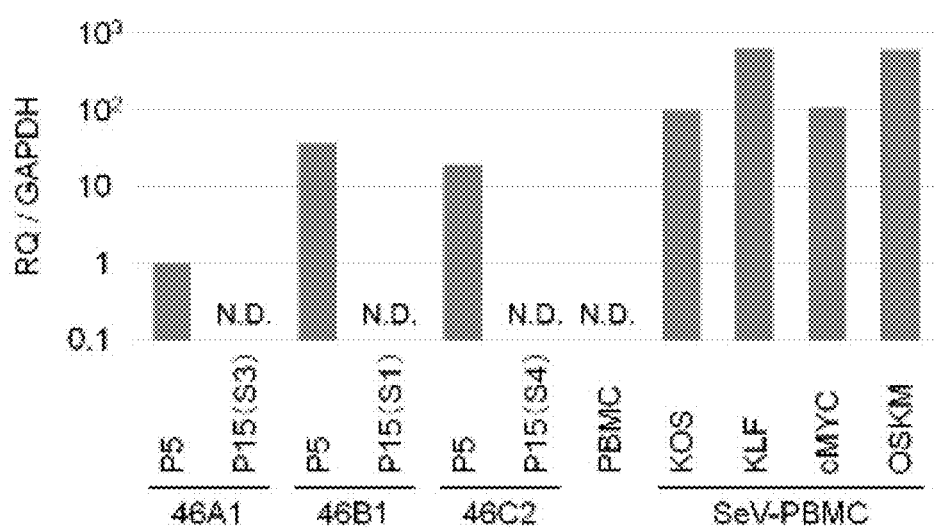
FIG. 10 is a graph for showing results of confirmation of the presence of SeV in each iPS cell line generated in Example 1 by quantitative RT-PCR (Experimental Example 1-2).

The presence of a SeV genome was confirmed for RNAs extracted and purified from the parental lines 46A1, 46B1, and 46C2 and subcloned lines by performing RT-PCR for SeV. Amplification was observed in the parental lines, but amplification was not observed in the subclones (FIG. 9 and FIG. 10).

Thus, the presence of cells free of SeV was confirmed. This confirmed that even cells in which SeV had disappeared were able to maintain iPS cells.

(Experimental Example 1-3) Confirmation of Rearranged Genes

Figure 11:
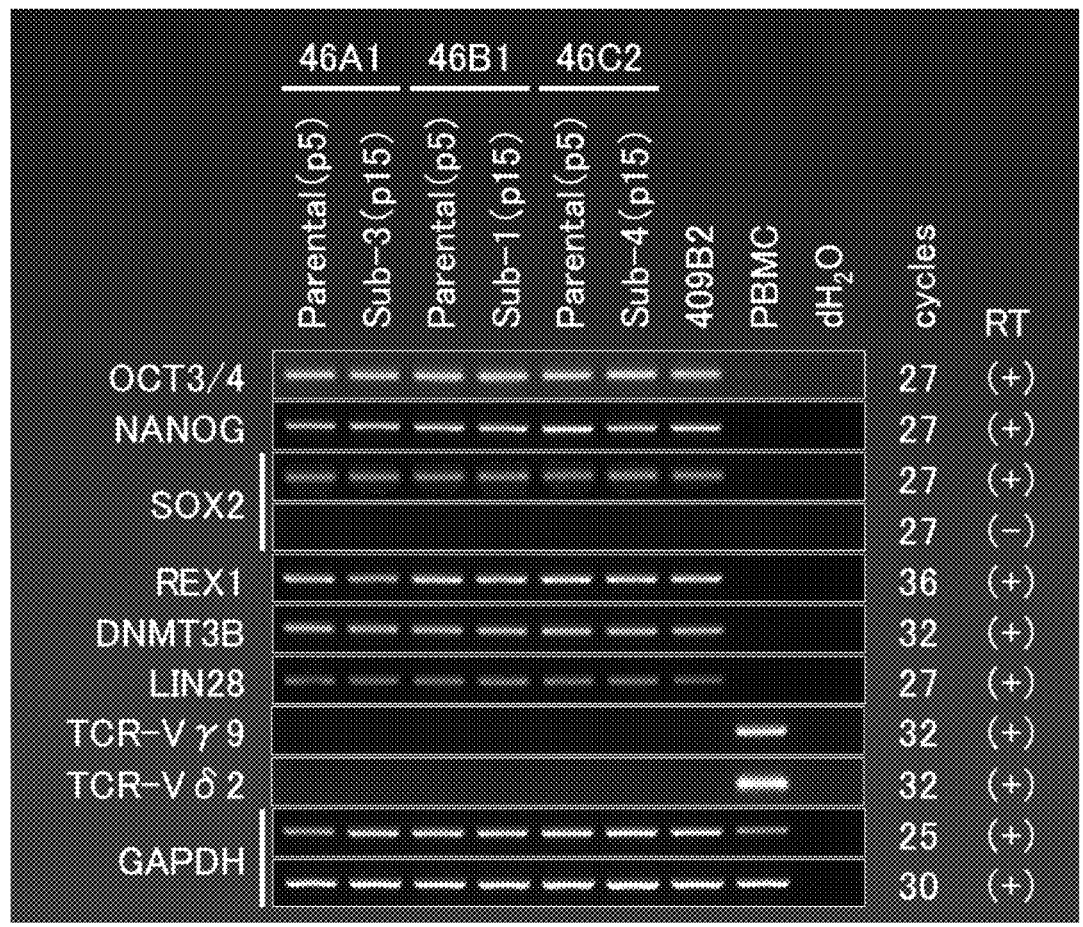
FIG. 11 is an image for showing results of confirmation of the expression of genes for undifferentiation markers and the expression of rearranged TCR-Vγ9 and TCR-Vδ2 genes in each iPS cell line generated in Example 1 by RT-PCR (Experimental Example 1-3).
Figure 12:
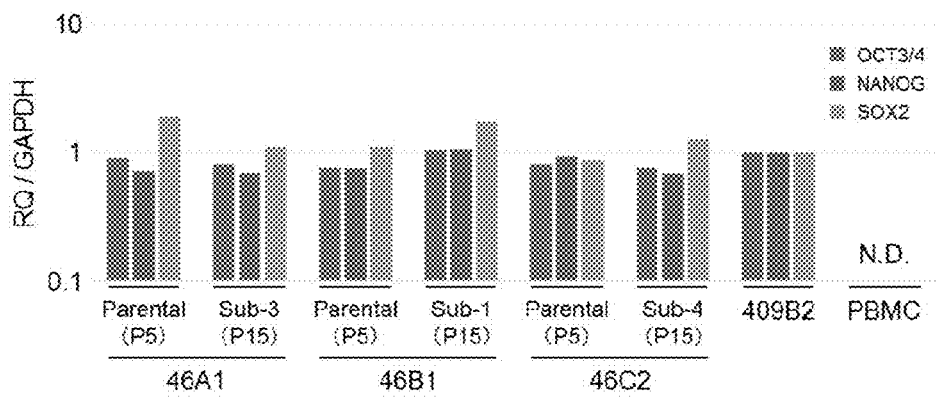
FIG. 12 is a graph for showing results of confirmation of the expression of genes for undifferentiation markers in each iPS cell line generated in Example 1 by quantitative RT-PCR (Experimental Example 1-3).
Figure 13:
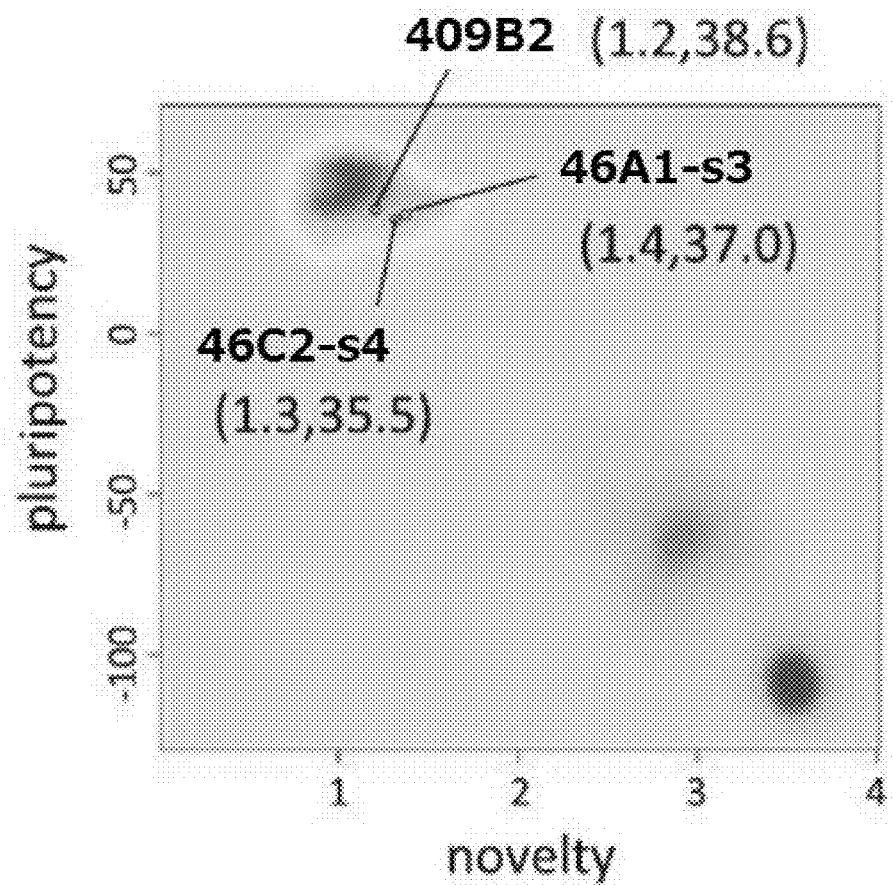
FIG. 13 is an image for showing results of evaluation of the pluripotency of cells by PluriTest for each iPS cell line generated in Example 1 (Experimental Example 1-3).
Figure 14:
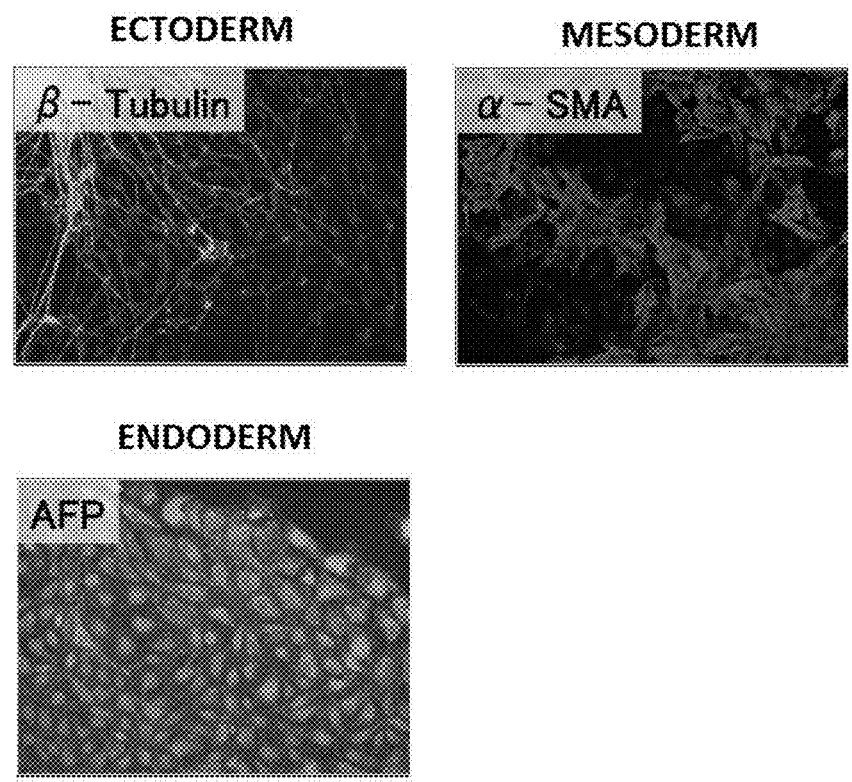
FIG. 14 are photographs for showing results of confirmation by immunostaining of the expression of respective markers that can be expressed specifically to ectoderm, mesoderm, and endoderm after differentiation of an iPS cell line generated in Example 1 into a tridermic system via embryoid body formation (Experimental Example 1-3).

In this Experimental Example, gene rearrangements in the iPS cells generated in Example 1 were confirmed.
1) RT-PCR for undifferentiation markers was performed using RNAs extracted and purified from the above-mentioned iPS cells (46A1, 46B1, and 46C2). As a result, it was confirmed that the cells expressed mRNAs for undifferentiation marker genes (FIG. 11 and FIG. 12). In addition, for the results of global gene expression analysis with a microarray, the pluripotency of the cells was evaluated by PluriTest (Muller F J, Schuldt B M, Williams R, et al. A bioinformatic assay for pluripotency in human cells. Nat Methods. 2011; 8:315-317.), and as a result, it was confirmed that the above-mentioned iPS cells were comparable to hitherto tested human pluripotent stem cells (FIG. 13).
2) The above-mentioned iPS cells were immunostained for typical undifferentiation marker proteins NANOG and OCT3/4, and as a result, each of the cells was stained, confirming expression thereof.
3) The above-mentioned iPS cells were dissociated into single cells, suspended in a primate ES/iPS cell medium (Primate ES Cell Medium, Reprocell) containing 20 μM ROCK inhibitor (Y-27632, WAKO), and seeded on low-cell-adhesion 96-well plates (PrimeSurface™ MS-9096, Sumitomo Bakelite Co., Ltd.) at 6×10⁴ cells. After 6 days to 8 days of culture, formed embryoid bodies were seeded in a gelatin-coated culture dish. The medium used at this time was also the above-mentioned primate ES/iPS cell medium. The medium was changed every 2 days, and culture was performed for an additional 14 days. The cells were immunostained with antibodies against respective marker proteins for three germ layers (endoderm, mesoderm, and ectoderm). As a result, staining was achieved for each of an ectodermal marker class III 0-tubulin, a mesodermal marker α-smooth muscle actin (α-SMA), and an endodermal marker Alpha Fetoprotein (AFP), confirming the expression of each marker (FIG. 14).

4) Confirmation of TCRδ and TCRγ Gene Rearrangements

Figure 15:
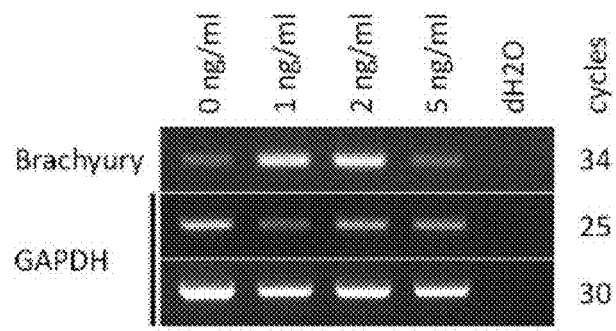
FIG. 15 is an image for showing results of confirmation of the rearrangement of genes for TCRδ and TCRγ among rearranged genes of each iPS cell line generated in Example 1 (Experimental Example 1-3).

Genomic DNAs was extracted and purified from the subclones of the iPS cell lines generated in Example 1. PCR was performed in accordance with BIOMED-2 protocols (van Dongen et al., 2003), and electrophoresis was performed with 2% agarose gel. Bands of target sizes were excised, and DNA was extracted with a QIAquick™ gel-extraction kit (QIAGEN). Fragment analysis was performed with a BigDye™ terminator v3.1 cycle sequencing kit (Applied Biosystems) and an ABI 3130 genetic analyzer (Applied Biosystems) (FIG. 15). A peak was observed in a Vγ-Jγ region, but no peak was observed for Vβ-Jβ. The results suggested that the iPS cells generated in Example 1 had a rearranged γδ-TCR gene instead of an αβ-TCR.

The foregoing results suggested that the iPS cells generated in Example 1 expressed markers for an undifferentiated state, and the iPS cells had a rearranged γδ-TCR gene.

(Experimental Example 1-4) Differentiation into Hematopoietic Cells

Figure 16:
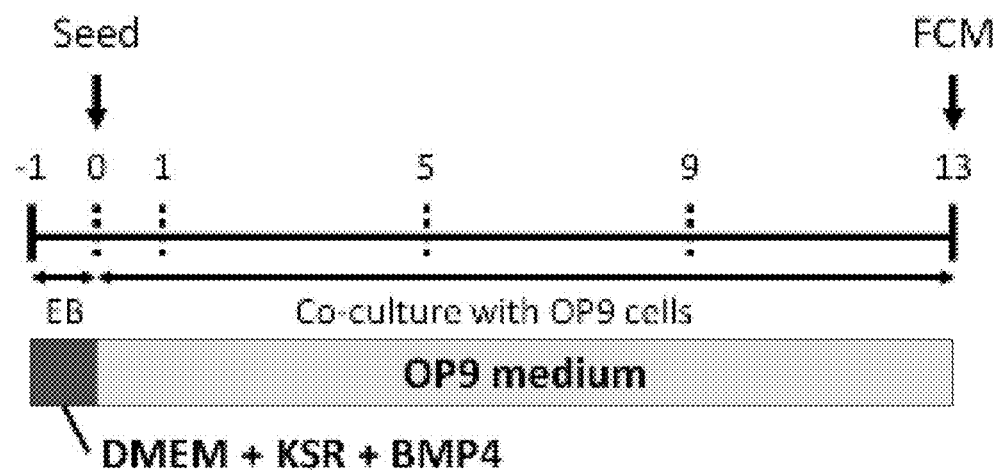
FIG. 16 is a diagram for illustrating an experimental protocol in the case where differentiation from each iPS cell line generated in Example 1 into hematopoietic cells was confirmed (Experimental Example 1-4).
Figure 17:
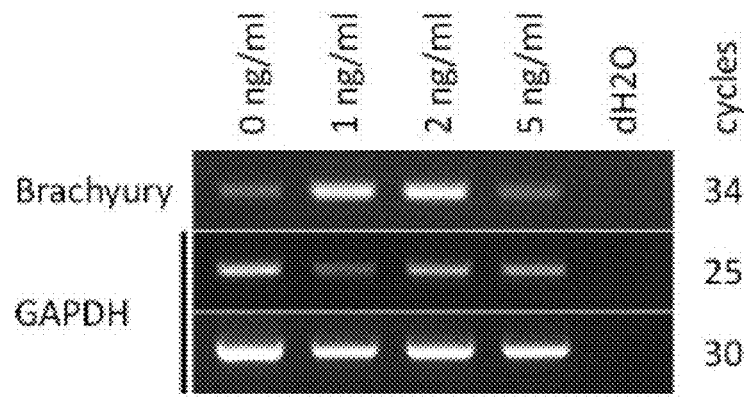
FIG. 17 is an image for showing results of confirmation of the expression of Brachyury serving as a mesodermal marker after treating each iPS cell line generated in Example 1 with BMP4 at various concentrations (Experimental Example 1-4).
Figure 18:
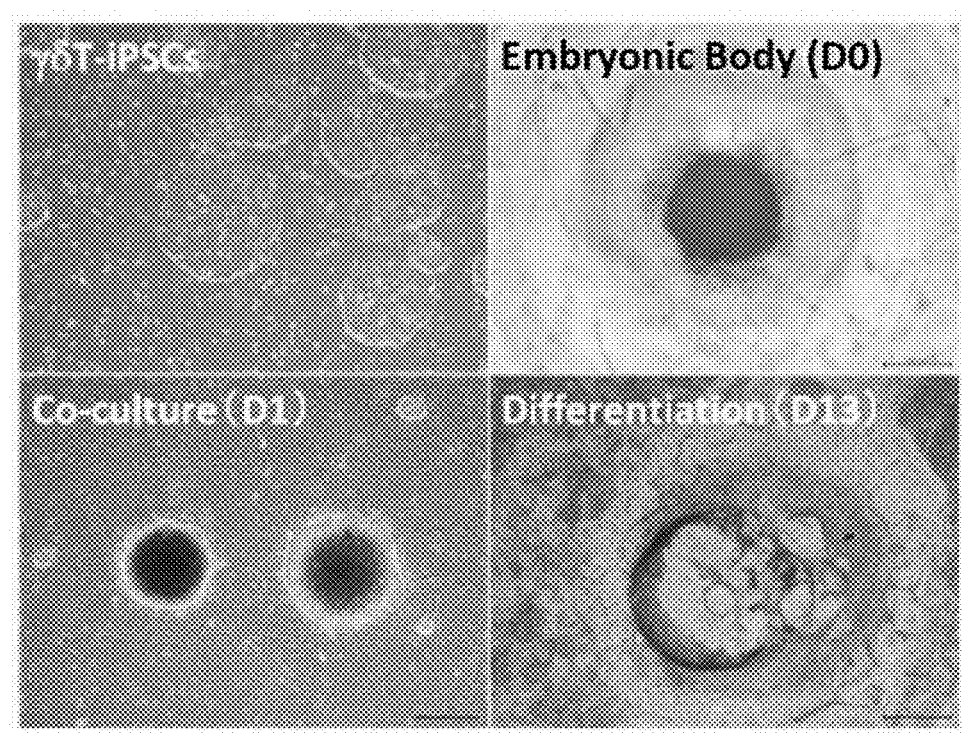
FIG. 18 are photographs for showing observation results obtained by phase-contrast microscopic observation of iPS cells before the initiation of differentiation induction, an embryoid body, and cells on day 1 and day 13 of culture on OP9, which were generated in accordance with the protocol of FIG. 14 (Experimental Example 1-4).
Figure 19:
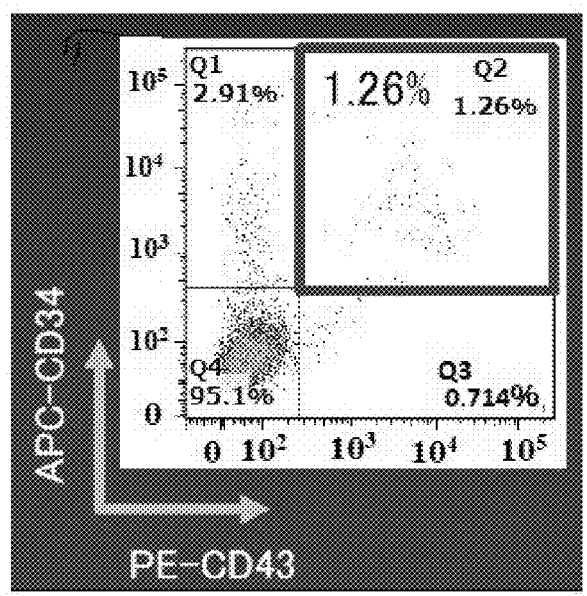
FIG. 19 is a graph for showing results obtained by staining cells on day 13 of culture with fluorescence-labeled antibodies against CD34 and CD43, and analyzing the formation of hematopoietic progenitor cells (CD34+/CD43+) by flow cytometry (Experimental Example 1-4).

In this Experimental Example, differentiation from the iPS cells generated in Example 1 into hematopoietic cells was confirmed. An experiment was performed on the basis of a protocol illustrated in FIG. 16.
1) The iPS cells were dissociated into single cells, and suspended in a KSR/DMEM medium (KSR 15%) containing 0 ng/mL to 5 ng/mL of BMP4. 5×10⁴ cells were seeded on low-cell-adhesion 96-well plates (PrimeSurface™ MS-9096, Sumitomo Bakelite Co., Ltd.) and cultured to form an embryoid body in the same manner as in Experimental Example 3. The next day, RNA was extracted and purified, and a mesodermal marker brachyury was confirmed by RT-PCR (FIG. 17).
2) 1 ng/mL of BMP4 was added, and an embryoid body was formed by the same technique as in 1) above, and the next day, seeded on stromal cells (OP9) serving as feeder cells. Then, culture was continued (see FIG. 16). The iPS cells before the initiation of differentiation induction, the embryoid body, and the cells on day 1 and day 13 of the culture on OP9 were observed with a phase-contrast microscope (FIG. 18). The cells on day 13 of the culture on OP9 were stained with fluorescence-labeled antibodies against CD34 and CD43, and analyzed by flow cytometry. The results are shown in FIG. 19. Hematopoietic progenitor cells of interest, i.e., CD34+/CD43+ cells were found at a proportion of 1.26%. In Table 1, the results of three times of the experiment are shown.

TABLE 1

|        | CD34+/CD43+ cells | CD34+/CD43− cells |
|--------|-------------------|-------------------|
| Exp. A | 1.26%             | 2.91%             |
| Exp. B | 1.88%             | 6.93%             |
| Exp. C | 0.56%             | 5.53%             |

The results shown above confirmed that the iPS cells generated in Example 1 were capable of being induced to differentiate into blood progenitor cells.

(Experimental Example 1-5) Differentiation into Hematopoietic Cells

Figure 20:
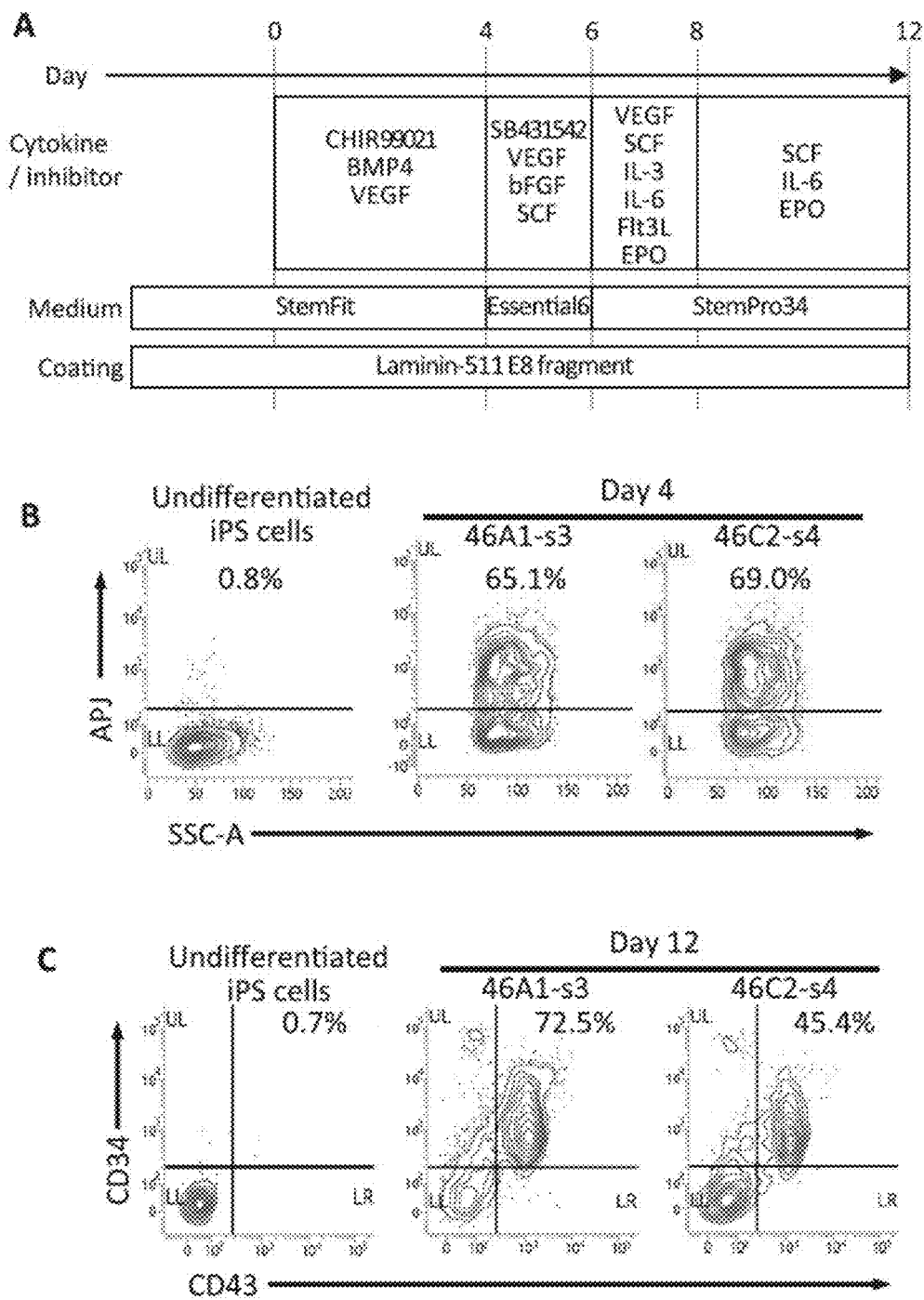
FIG. 20 are a diagram and graphs for illustrating and showing results of confirmation of results of differentiation induction from each iPS cell line generated in Example 1 into blood progenitor cells.

In this Experimental Example, the iPS cells generated in Example 1 were treated on the basis of a protocol illustrated in FIG. 20A to induce the differentiation of the cells. The cells were cultured in StemFit™ medium, Essetial 6 medium, and StemPro34 medium using a culture vessel coated with iMatrix-511 (Nippi).

On day 4 and day 12 of the culture, the cells were analyzed by flow cytometry. As a result, it was found that APJ serving as a marker for early hematovascular progenitor cells was expressed at a high proportion on day 4 (FIG. 20B), and hematopoietic progenitor cell marker (CD34 and CD43)-positive cells were each obtained at a high proportion on day 12 (FIG. 20C).

The results shown above also confirmed that the iPS cells generated in Example 1 were capable of being induced to differentiate into blood progenitor cells.

(Example 2) Generation of iPS Cells

Figure 21:
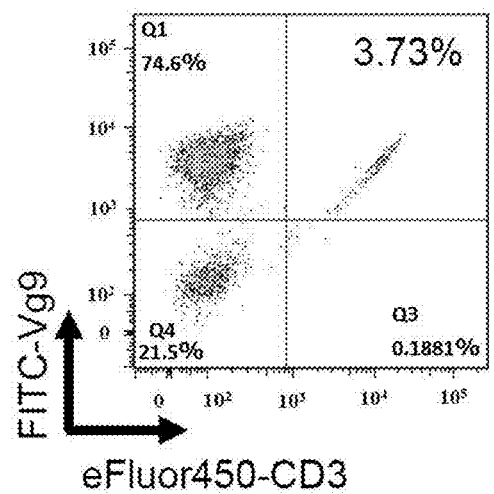
FIG. 21 are a graph and an image for showing generation of iPS cells from a cell population having a low proportion of γδT cells.
Figure 21:
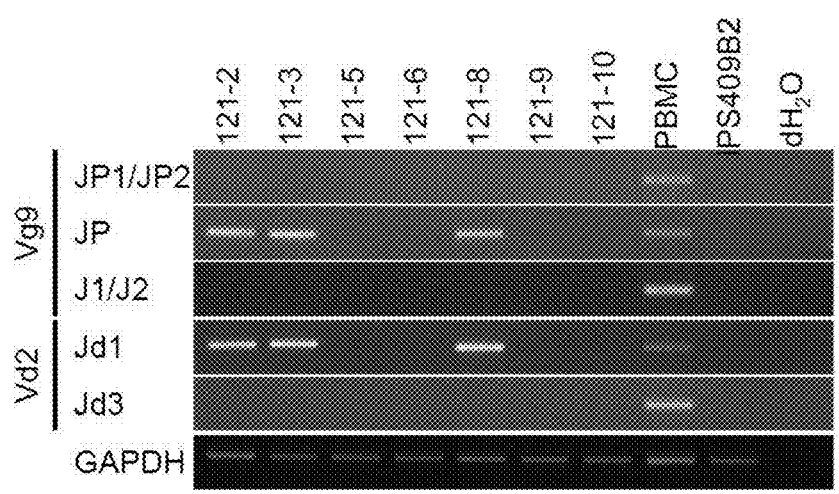

In this Example, an attempt was made to establish γδT cell-derived iPS cells from a cell population having a low proportion of γδT cells. In Example 1, human PBMCs were treated with the bisphosphonate and IL-2 for 13 days, whereas in this Example, human PBMCs were treated and cultured with the bisphosphonate and IL-2 for 4 days. As a result, the proportion of γδT cells in the 4-day culture was as low as 3.73% (FIG. 21A).

The cell population having a proportion of γδT cells as low as 3.73% described above was treated with a SeV vector carrying genes expressing OCT3/4, SOX2, KLF4, and C-MYC by the same technique as in Example 1. Genomic DNA was extracted from iPS cells generated in this Example, and it was confirmed whether the rearrangement of each of the Vγ9 and Vδ2 genes was present by the same technique as in Example 1-1. The genome of PBMCs including γδT cells serving as a positive control, and the genome of iPS409B2, a cell line harboring no TCR gene rearrangement, serving as a negative control were also similarly analyzed. As a result, the confirmation was made for each of the established seven cell lines, and bands of Vγ9 and Vδ2 were found in each of the three lines of 121-2, 121-3, and 121-8, confirming that each of the Vγ9 and Vδ2 genes had been rearranged (FIG. 21B).

Thus, iPS cells in which each of the Vγ9 and Vδ2 genes had been rearranged were able to be established even from a cell population having such a cell density that the proportion of γδT cells was low.

(Experimental Example 2-1) Generation of iPS Cells

In this Experimental Example, differentiation from the iPS cells generated in Example 2 into hematopoietic cells was confirmed. A suspension of the iPS cells generated in Example 2 containing Rock inhibitor Y27632 and iMatrix-511 (Nippi) was dropped to arbitrary sites on a culture dish. The cell density of the suspension in this case is not limited, but is preferably from about $1\times10^5$/mL to about $1\times10^6$/mL, and a liquid amount to be dropped to one site is preferably from 1 μL to 2 μL. The cells adhere to the culture dish when cultured in an incubator for from 1 hour to 2 hours, and hence a general amount of a medium is added thereto. When culture is continued, iPS cell colonies having a morphology similar to that of cells passed by a general method are obtained (see FIG. 22A).

Figure 22:
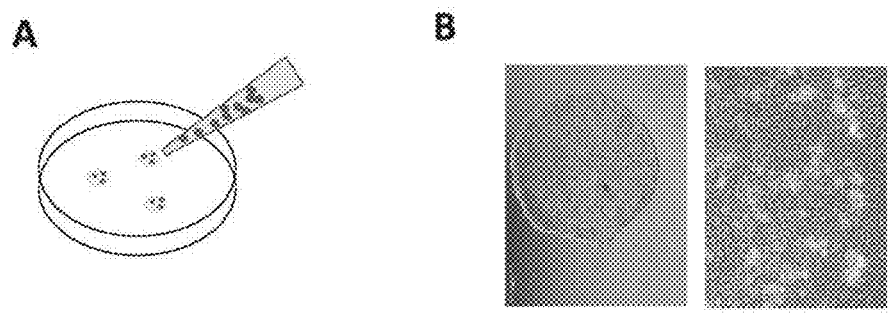
FIG. 22 are a view, photographs, and a graph for showing results of differentiation induction by a novel method for differentiation induction into blood progenitor cells using an iPS cell line generated in Example 1. When an iPS cell suspension is dropped to arbitrary sites in a culture dish and incubated for from about 1 hour to about 2 hours, cells in droplets adhere to the culture dish (FIG. 22A). When a general amount of a culture medium is added thereto and the cells are cultured, iPS cell colonies having nearly constant sizes can be formed at an arbitrary number of arbitrary sites in the culture dish (FIG. 22B). Starting with state, differentiation induction was performed by the method illustrated in FIG. 20A.
Figure 22:
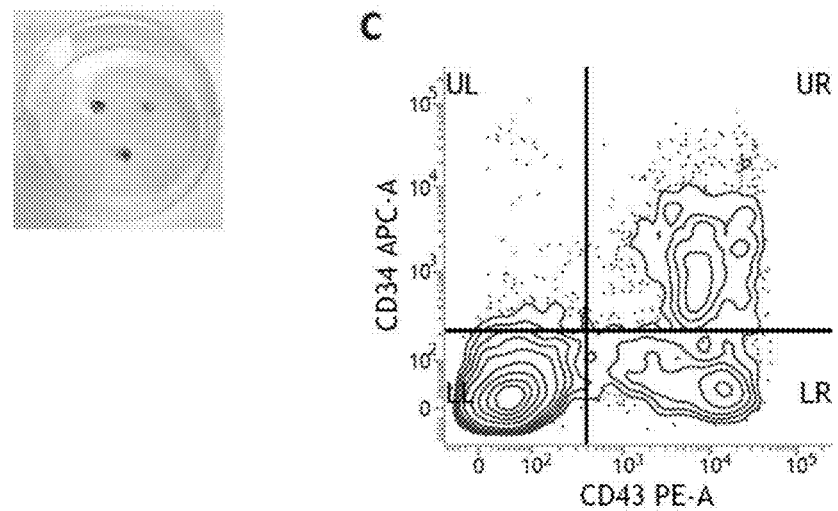

Photographs shown in FIG. 22B are a phase-contrast microscopic image on day 9 and a macroscopic image of crystal violet stained cells. It was confirmed that undifferentiated iPS cell colonies were formed at arbitrary sites. At a timing at which colonies formed by this method had diameters of from 500 m to 1,000 m, differentiation induction treatment was performed by the protocol illustrated in FIG. 20A of Experimental Example 1-5. Analysis by flow cytometry was performed by the same technique as in Experimental Example 1-4, and as a result, hematopoietic progenitor cells of interest, i.e., CD34+/CD43+ cells were found at a proportion of 20.9% (FIG. 22C).

Differentiation induction from pluripotent stem cells is affected by cell density and colony density. In this regard, in a general passage method involving seeding a suspension containing a constant number of cells, it is impossible to precisely regulate those densities, which is a cause of the impairment of the robustness of induction efficiency or the like. According to this method, differentiation induction conditions can be investigated while the cell density and the colony density are set constant. With this, for example, screening can be performed for the optimal kind of cytokine and the concentration thereof, or an alternative compound to the cytokine.

INDUSTRIAL APPLICABILITY

As described in detail above, according to the method of the present invention, iPS cells having a rearranged γδ-TCR gene can be effectively generated. More specifically, iPS cells having a rearranged γδ-TCR gene can be effectively generated by the method including the steps of: 1) stimulating collected blood cells with any one kind or a plurality of kinds of interleukins selected from IL-2, IL-15, and IL-23, and a bisphosphonate; 2) introducing at least four kinds of genes expressing cell reprogramming factors into the blood cells through use of a SeV vector; and 3) culturing the cells having introduced therein the genes. In particular, the method may be free of the step of treating the blood cells with an antibody or the like before the steps 1) to 3). According to the method of the present invention, desired iPS cells can be effectively generated without the generation of iPS cells from cells obtained by recovering rearranged γδ-TCR gene-positive cells from blood cells through, for example, antibody treatment against a γδ-TCR using a technique such as a cell sorter. Further, the step of performing treatment with an antibody or the like can be omitted, and hence the method of the present invention is excellent in that an operation for, for example, removing the antibody with which the treatment has been performed from the resultant cell population is also not required.

Thus, the iPS cells generated by the method of the present invention can be differentiated into desired cells by differentiation induction treatment. As a result, for example, γδT cells capable of attacking many kinds of cancer cells in a MHC-unrestricted manner can be possibly prepared, and hence the method of the present invention is extremely useful. With this, it is considered that, out of T lymphocytes, which attack cancer cells and the like, γδT cells can be generated.

The invention claimed is:

1. A method of generating iPS cells having a rearranged γδ-TCR gene, comprising the following steps 1) to 3):
   i) stimulating collected blood cells in a medium with any one kind or a plurality of kinds of interleukins selected from IL-2, IL-15, and IL-23, and a bisphosphonate;
   ii) introducing into the blood cells a Sendai virus (SeV) vector comprising at least four genes encoding cell reprogramming factors; and
   iii) culturing the cells having introduced therein the genes and thereby generating the iPS cells having the rearranged γδ-TCR gene, wherein the bisphosphonate comprises any one kind or a plurality of kinds selected from zoledronic acid, pamidronic acid, alendronic acid, risedronic acid, ibandronic acid, incadronic acid, and minodronic acid, the method is free of a step of purifying or enriching γδ-TCR gene-positive cells by a cell sorter, and the method is free of a step of treating the collected blood cells with an antibody against γδ-TCR before the steps i) to iii), the proportion of γδ T cells contained in the cell population obtained after step i) is 3.73% or less, and the iPS cells having a rearranged γδ-TCR gene are generated in at least 3 out of 7 cell lines established after step iii).

2. The method of generating iPS cells having a rearranged γδ-TCR gene according to claim 1, wherein the cell reprogramming factors comprise OCT3/4, SOX2, KLF4, and c-MYC.

3. The method of generating iPS cells having a rearranged γδ-TCR gene according to claim 1, wherein the interleukins comprise IL-2.

4. The method of generating iPS cells having a rearranged γδ-TCR gene according to claim 1, wherein the blood cells comprise peripheral blood mononuclear cells.

5. The method of generating iPS cells having a rearranged γδ-TCR gene according to claim 1, wherein the blood cells comprise cells of human origin.

6. A cell population, comprising iPS cells having a rearranged γδ-TCR gene generated by the method of generating iPS cells having a rearranged γδ-TCR gene, according to claim 1.

7. Blood progenitor cells, which are obtained by inducing differentiation of iPS cells having a rearranged γδ-TCR gene generated by the method of generating iPS cells having a rearranged γδ-TCR gene, according to claim 1.

8. The method of generating iPS cells having a rearranged γδ-TCR gene according to claim 1, wherein the culture period in the medium containing the interleukin and the bisphosphonate is from 2 days to 7 days.

9. The method of generating iPS cells having a rearranged γδ-TCR gene according to claim 1, the method further comprising adding one or more components selected from the group consisting of amino acids, antibiotics, and fetal calf serum (FCS) to the medium containing the interleukin and the bisphosphonate.

10. The method of generating iPS cells having a rearranged γδ-TCR gene according to claim 1, wherein the SeV vector is an F-deficient SeV vector.

11. The method of generating iPS cells having a rearranged γδ-TCR gene according to claim 1, wherein step iii) is performed without the use of feeder cells.

12. The method of generating iPS cells having a rearranged γδ-TCR gene according to claim 1, wherein step iii) is performed while gradually replacing a known medium suited for the culture of the blood cells with a medium suited for the culture of iPS cells along with a transition from the blood cells to the iPS cells.

13. The method of generating iPS cells having a rearranged γδ-TCR gene according to claim 1, wherein an additive suited for the culture of iPS cells is added to the medium used in step iii).

14. The method of generating iPS cells having a rearranged γδ-TCR gene according to claim 1, wherein the concentration of each interleukin is from 50 IU/mL to 200 IU/mL.

15. The method of generating iPS cells having a rearranged γδ-TCR gene according to claim 1, wherein the concentration of each interleukin is from 75 IU/mL to 150 IU/mL.

16. The method of generating iPS cells having a rearranged γδ-TCR gene according to claim 1, wherein the concentration of the bisphosphonate is from 1 μM to 20 PM.

17. The method of generating iPS cells having a rearranged γδ-TCR gene according to claim 1, wherein the concentration of the bisphosphonate is from 1 μM to 10 μM.

18. The method of generating iPS cells having a rearranged γδ-TCR gene according to claim 1, wherein the interleukin comprises IL-2 and the bisphosphonate comprises zoledronic acid.

* * * * *